United States Patent
Han et al.

(10) Patent No.: US 8,149,759 B2
(45) Date of Patent: Apr. 3, 2012

(54) APPARATUS AND METHOD FOR PROCESSING BANDWIDTH REQUEST IN MULTIHOP RELAY BROADBAND WIRELESS ACCESS (BWA) COMMUNICATION SYSTEM

(75) Inventors: Ki-Young Han, Yongin-si (KR); Jae-Woo So, Bucheon-si (KR); Yong-Seok Kim, Suwon-si (KR); Sang-Wook Kwon, Daegu (KR); Chi-Sung Bae, Andong-si (KR); Soo-Yong Jeon, Daejeon (KR); Dong-Ho Cho, Seoul (KR); Oh-Hyun Jo, Cheongju-si (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 1106 days.

(21) Appl. No.: 12/011,092

(22) Filed: Jan. 24, 2008

(65) Prior Publication Data
US 2008/0181168 A1 Jul. 31, 2008

(30) Foreign Application Priority Data
Jan. 25, 2007 (KR) .......... 10-2007-0007800

(51) Int. Cl.
*H04B 7/14* (2006.01)
*H04B 7/216* (2006.01)
(52) U.S. Cl. ........... 370/315; 370/335
(58) Field of Classification Search ............. None
See application file for complete search history.

(56) References Cited

U.S. PATENT DOCUMENTS

| | | | |
|---|---|---|---|
| 2006/0153132 A1 | 7/2006 | Saito | |
| 2006/0264172 A1 | 11/2006 | Izumikawa et al. | |
| 2007/0153746 A1* | 7/2007 | Lee et al. | 370/335 |
| 2008/0305804 A1* | 12/2008 | Lee et al. | 455/446 |
| 2010/0046413 A1* | 2/2010 | Jin et al. | 370/315 |

FOREIGN PATENT DOCUMENTS

| | | |
|---|---|---|
| EP | 1 786 144 A2 | 5/2007 |
| KR | 10-2007-0042103 | 4/2007 |
| WO | WO 2005/060132 A1 | 6/2005 |
| WO | WO 2008/091126 A1 | 7/2008 |

OTHER PUBLICATIONS

International Search Report issued on Apr. 22, 2008 in International Application No. PCT/KR2008/000466.
European Search Report dated Jan. 10, 2011 in connection with European Patent Application No. EP 08 00 1378.

* cited by examiner

*Primary Examiner* — John Blanton (57) ABSTRACT

Apparatuses and methods for processing a bandwidth request in a multihop relay Broadband Wireless Access (BWA) communication system are provided. A communication method of a Relay Station (RS) includes determining a number of bandwidth request ranging codes received from Subscriber Stations (SSs); and reporting the number of the bandwidth request ranging codes to a Base Station (BS). A communication method of the BS includes allocating a resource to an RS to report on a number of detected bandwidth request ranging codes; and receiving a report on the number of the bandwidth request ranging codes using the allocated resource.

20 Claims, 6 Drawing Sheets

APPARATUS AND METHOD FOR PROCESSING BANDWIDTH REQUEST IN MULTIHOP RELAY BROADBAND WIRELESS ACCESS (BWA) COMMUNICATION SYSTEM

CROSS-REFERENCE TO RELATED APPLICATION(S) AND CLAIM OF PRIORITY

This application claims priority under 35 U.S.C. §119(a) to an application filed in the Korean Intellectual Property Office on Jan. 25, 2007 and assigned Serial No. 2007-7800, the disclosure of which is herein incorporated by reference.

TECHNICAL FIELD OF THE INVENTION

The present invention relates generally to apparatuses and methods for processing a bandwidth request in a multihop relay Broadband Wireless Access (BWA) communication system. More particularly, the present invention relates to an apparatus and a method for a relay station to report of a number of terminals which send a bandwidth request ranging code to a base station.

BACKGROUND OF THE INVENTION

The fourth generation (4G) mobile communication system, which is the next-generation communication system, has cells of quite small radius to accommodate rapid communications and more traffic. It is anticipated that the centralized design is almost impossible using a current radio network design scheme. In this respect, the 4G communication system needs to be controlled and implemented in a distributed manner and to actively cope with an environmental change such as joining of a new base station. This is why the 4G communication system requires a self-configurable wireless network.

To actually implement the self-configurable wireless network required in the 4G communication system, it is necessary to adopt a technique of an ad-hoc network to the wireless communication system. For example, a multihop relay cellular network adopts a multihop relay scheme of the ad-hoc to the cellular network including a stationary base station.

Transceiving signals through a direct link between the fixed base station and a terminal, a typical cellular communication system can easily configure the radio communication link of high reliability between the base station and the terminal. Yet, the cellular communication system is subject to low flexibility in the wireless network configuration because of the fixed position of the base station. As a result, a cellular communication system scarcely provides effective communication services in a wireless environment under frequent changes of the traffic distribution or the required traffic.

To address those shortcomings, a cellular wireless communication system can employ a multihop relay data delivery scheme using a fixed or mobile relay station or general terminal. A multihop relay wireless communication system is able to reconfigure the network in prompt reaction to a communication environmental change and to operate the entire wireless network more efficiently. For example, the multihop relay wireless communication system can extend a cell service coverage area and increase system capacity. In a poor channel condition between the base station and the terminal, a radio channel of better channel condition can be provided to the terminal by installing a relay station between the base station and the terminal and establishing a multihop relay path via the relay station. Also, in a cell boundary under the hostile channel condition from the base station, the multihop relay scheme can offer the rapid data channel and the extended cell service coverage.

Figure 1:
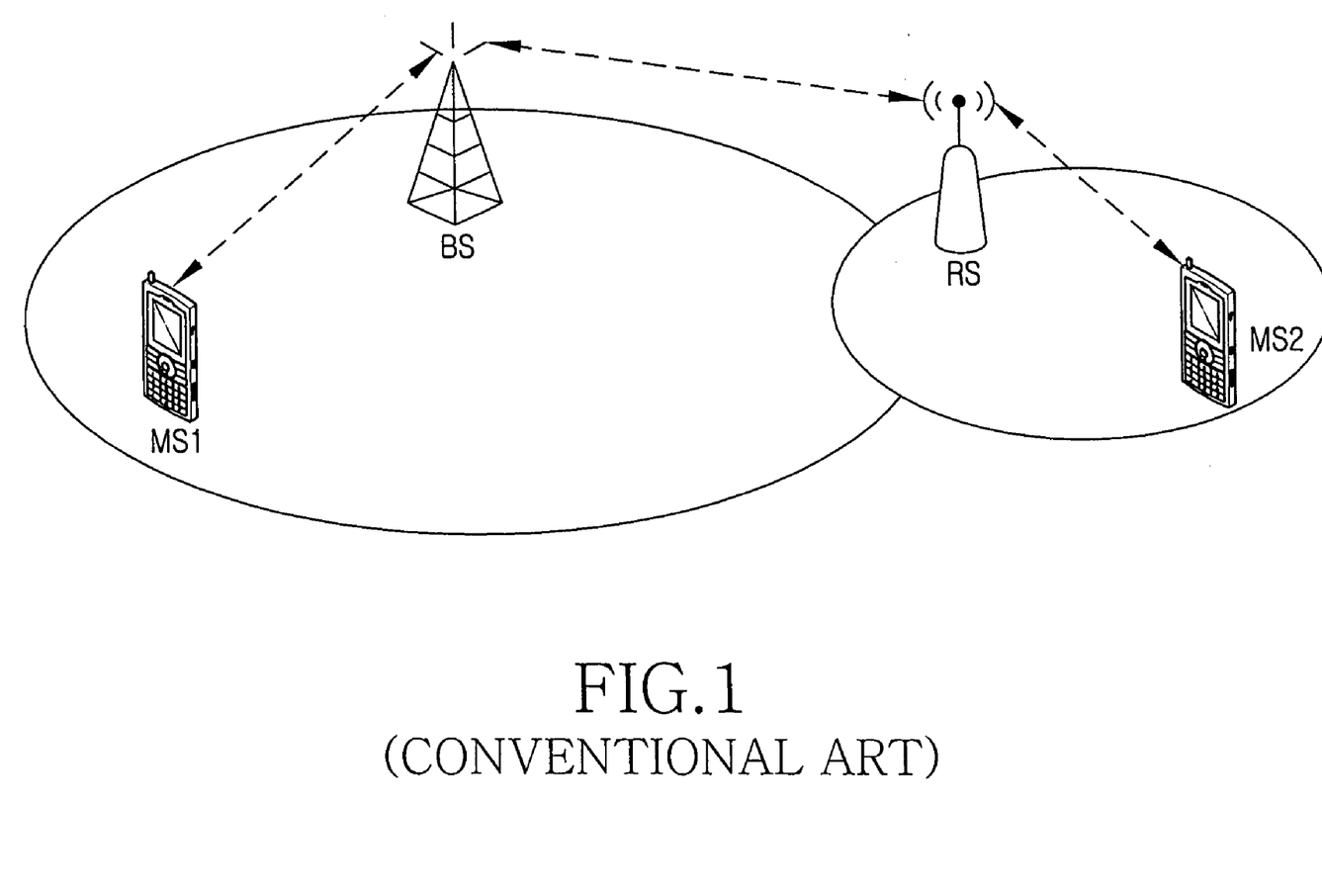
FIG. 1 illustrates a general multihop relay cellular network.

FIG. 1 depicts a general multihop relay cellular network.

A first mobile station (MS1) in a coverage of a base station (BS) is connected to the BS through a direct link. A second mobile station (MS2), which travels outside the coverage of the BS and suffers bad channel condition from the BS, is connected to the BS via a relay station (RS). In the cell boundary of the BS or in a shadow region shielded by buildings, the MS2 communicates with the BS via the RS. As such, in the cell boundary under the hostile channel condition, the multihop relay scheme can provide the rapid data channel and extend the cell service coverage.

A broadband wireless access (BWA) communication system based on Institute of Electrical and Electronics Engineers (IEEE) 802.16 standard performs the ranging using a Code Division Multiple Access (CDMA) code to request the bandwidth. To request the bandwidth, the MS2 selects one ranging code at random among a CDMA code set (or a ranging code set), maps the selected ranging code to a random ranging slot, and then transmits the ranging code to the BS.

When the ranging is applied to the multihop relay system, MS1 directly communicating with the BS can operate the same as before. However, when the MS2 communicates via the RS, the RS needs to relay the ranging code from the MS2 to the BS or inform the BS of the information relating to the received ranging code.

If the RS relays the ranging code over the ranging region allocated to the MS2, the BS cannot tell whether the ranging code is received from the MS2 or the RS because the ranging code does not include terminal information. Hence, the ranging code can be dividing into an MS ranging code and an RS ranging code. In this case, the code discrimination is feasible but the probability of the code collision is likely to rise because of the reduced range (or number) of the substantially available codes. Alternatively, a ranging region dedicated to the RS can be used, which would otherwise disadvantageously cause the resource waste.

SUMMARY OF THE INVENTION

To address the above-discussed deficiencies of the prior art, it is a primary aspect of the present invention to substantially solve at least the above problems and/or disadvantages and to provide at least the advantages below. Accordingly, an aspect of the present invention is to provide apparatuses and methods for processing a bandwidth request in a multihop relay wireless communication system.

Another aspect of the present invention is to provide an apparatus and a method for an RS to report a number of bandwidth request ranging codes received from mobile stations to a BS in a multihop relay wireless communication system.

A yet another aspect of the present invention is to provide apparatuses and methods for a BS to record and send only partial information of a resource allocation message to an RS, and for the RS to record and relay the remaining information to the MS in a multihop relay wireless communication system.

The above aspects are achieved by providing a communication method of a Relay Station (RS) in a multihop relay wireless communication system. The method includes receiving one or more bandwidth request ranging codes from subordinate Subscriber Stations (SSs) of the RS; determining a number of the received bandwidth request ranging codes; reporting the number of the bandwidth request ranging codes to a Base Station (BS); receiving one or more resource allocation messages from the BS in response to the bandwidth request ranging codes; updating the resource allocation messages by recording ranging code related information in the resource allocation messages; and transmitting the updated resource allocation messages to the subordinate SSs.

According to one aspect of the present invention, a communication method of a BS in a multihop relay wireless communication system includes allocating a resource to an RS to report on a number of detected bandwidth request ranging codes; receiving a report on the number of the bandwidth request ranging codes using the allocated resource; scheduling resources using the reported number of the bandwidth request ranging codes; generating a resource allocation message to allocate a resource to an SS which sends the bandwidth request ranging code, according to the result of the scheduling; and transmitting the generated resource allocation message to the RS.

According to another aspect of the present invention, an RS in a multihop relay wireless communication system includes a controller for determining a number of bandwidth request ranging codes received from subordinate SSs of the RS; a transmitter for transmitting the bandwidth request ranging codes to the BS; a receiver for receiving resource allocation messages from the BS in response to receiving the bandwidth request ranging codes; and a message generator for updating the resource allocation messages by including ranging code related information in the resource allocation messages.

According to yet another aspect of the present invention, a BS in a multihop relay wireless communication system includes a transmitter for transmitting a message to allocate a resource, and to an RS to report on a number of detected bandwidth request ranging codes; a receiver for receiving the number of the bandwidth request ranging codes using the allocated resource; a controller for scheduling resources using the number of the bandwidth request ranging codes; and a message generator for generating a resource allocation message to allocate a resource to a SS which sends the bandwidth request ranging code according to the result of the scheduling.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 2 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

The present invention provides a method for processing a bandwidth request of a mobile station (MS) connected to a relay station (RS) in a multihop relay wireless communication system.

In the following explanations, a broadband wireless communication system adopts an Orthogonal Frequency Division Multiplexing (OFDM) scheme or an Orthogonal Frequency Division Multiple Access (OFDMA) scheme by way of example.

The present invention assumes a multihop relay system of FIG. 1. A base station (BS) has the right to control mobile stations registered to the relay station (RS), and the RS relays a control signal from the BS. The mobile station (MS) cannot distinguish the RS from the BS. Even though the MS is registered to the RS, it operates as if the RS is the BS. To communicate with its registered MS, the RS acts as the BS and exchanges necessary control information and data with the MS. The control information is generated by the BS to which the RS belongs and then transmitted to the MS via the RS. To communicate with the BS, the RS acts the same as the MS, receives a resource allocated from the BS, and relays information of its registered mobile stations to the BS using the allocated resource. Herein, the BS can distinguish the RS and the MS using a Connection IDentifier (CID).

When requiring an uplink resource, the MS transmits a ranging code (a CDMA code) over the ranging region. Next, upon receiving a resource allocation message (CDMA_Allocation_IE), the MS transmits a bandwidth request message (or header) or data using the resource designated in the resource allocation message.

Figure 2:
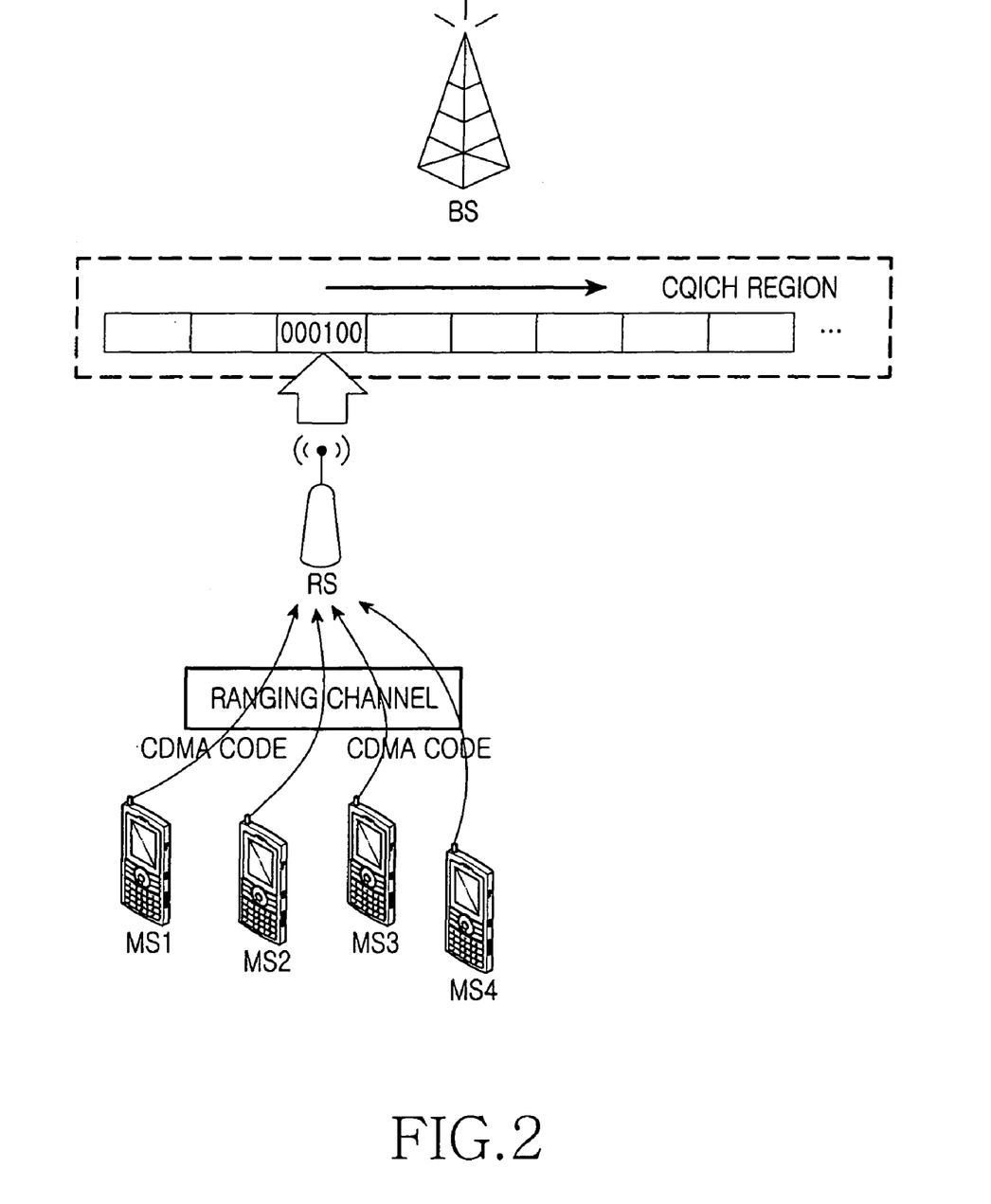
FIG. 2 illustrates one embodiment of the present invention.

The RS determines the number of the received ranging codes (Bandwidth Request (BR) CDMA codes) or the number of mobile stations and informs the BS of the determined number of the BR CDMA codes using the allocated resource (e.g., Channel Quality Indicator (CQI) channel). Referring to FIG. 2, receiving four ranging codes from four mobile stations, the RS transmits "4(=000100)" to the BS using the allocated resource (the CQI region). Next, upon receiving a resource allocation message (CDMA_Allocation_IE) from the BS, the RS fills empty or void fields of the resource allocation message with information and sends the message to the mobile stations. This is because the BS knows the number of MS sending the ranging code but does not know which ranging code the MS sends. Accordingly, the BS transmits the resource allocation message to the RS by filling only the known information with the unknown information filled with void values. The RS reports the number of the BR ranging codes received from at least one MS to the BS. In doing so, when the report is made through the CQI channel, the number of the ranging codes is reported to the BS as a code. In general cases, the number of the ranging codes can be reported to the BS as a message (MAC message or MAC header).

According to an embodiment of the present invention, a CQICH allocation message (CQICH_Allocation_IE) needs to be modified as shown in Table 1:

TABLE 1

| Syntax | Size (bits) | Notes |
|---|---|---|
| CQICH_Enhanced_Alloc_IE( ){ | | |
| Extended-2 UIUC | 4 | CQICH Enhance Alloc IE( ) = 0x00 |
|  | 8 | Length in bytes of following field |
| CQICH_ID | Variable | Index to uniquely identify the CQICH resource assigned to the MS |
| Period(= p) | 3 | A CQI feedback is transmitted on the CQICH every $2^P$ frames |
| Frame offset | 3 | The MS starts reporting at the frame of which the number has the same 3 LSB as the specified frame offset. If the current frame is specified, the MS should starts reporting in 8 frames |
| Duration(= d) | 3 | A CQI feedback is transmitted on the CQI channels indexed by the CQICH_ID for 10 × 2d frames. If d == 0b000, the CQICH is deallocated. If d == 0b111, the MS should report until the BS command for the MS to stop. |
| CQICH_Num | 4 | Number of CQICHs assigned to this CQICH_ID is (CQICH_num + 1) |
| for(i = 0; i < CQICH_num + 1; i++){ | | |
| Feedback Type | 3 | 0b000-0b010 = Fast DL measurement/Default Feedback depending on CQICH types<br>0b011 = Quantized precoding weight feedback<br>0b100 = Index to precoding matrix in codebook<br>0b101 = Channel Matrix Information<br>0b110 = CDMA code MS Information<br>0b111 = Reserved |
| Allocation index | 6 | Indexed to the Fast-feedback channel region marked by UIUC = 0 |
| CQICH Type | 3 | 0b000 = 6-bit CQI<br>0b001 = reserved<br>0b010 = 3-bit CQI(even)<br>0b011 = 3-bit CQI(odd)<br>0b100 = 6 bit CQI(primary)<br>0b101 = 4 bit CQI(secondary)<br>0b110 = 6 bit CQI(CDMA code)<br>0b111 = Reserved |
| STTD indication | 1 | when CQICH type = 000, 0 = reserved 1 = used STTD in PUSC only (see FIG. 249) |
| } | | |
| Band_AMC_precoding_Mode | 1 | 0 = One common precoder for all bands.<br>1 = Distinct precoders for the bands with the highest S/N value, up to the number of short term precoders fed back as specified by Nr_Precoders_feedback |
| If(Band_AMC_Precoding_Mode = 1) {Nr_Precoders_feedback (= N)} | 3 | Nr of precoders feedback = N |
| Padding | variable | The padding bits are used to ensure the IE size is integer number of bytes |
| } | | |

As shown in Table 1, to use the CQI channel to report of the number of mobile stations sending the ranging code, the BS sets the Feedback Type field of the CQICH allocation message to "0b110" and the CQICH Type field to "0b110". By modifying the CQICH allocation message, the RS can report the number of mobile stations sending the ranging code to the BS on the CQI channel.

The resource allocation message (CDMA_Allocation_IE) in response to the BR ranging code is shown in Table 2:

TABLE 2

| Syntax | Size | Notes |
|---|---|---|
| CDMA_Allocation_IE{ | | |
| Duration | 6 bits | |
| Repetition Coding Indicator | 2 bits | 0b00: No repetition coding<br>0b01: Repetition coding of 2 used<br>0b10: Repetition coding of 4 used<br>0b11: Repetition coding of 6 used |
| Ranging Code | 8 bits | |
| Ranging symbol | 8 bits | |
| Ranging subchannel | 7 bits | |
| BW request mandatory | 1 bits | 1: yes, 0: no |
| } | | |

As shown in Table 2, the resource allocation message includes duration information of the allocated resource, repetition coding indication information, ranging code information received from the MS, used ranging symbol information, used ranging subchannel information, and BW request mandatory information. Herein, the BS transmits the resource allocation message to the RS by recording the duration information, the repetition coding indication information and the BW request mandatory information and recording one or more zeros in the other fields (the ranging code, the ranging symbol, and the ranging subchannel). The RS updates the resource allocation message by filling in the other fields (the ranging code, the ranging symbol, and the ranging subchannel) with the appropriate ranging code and transmit region information.

Now, detailed operations are described by referring to the drawings.

Figure 3:
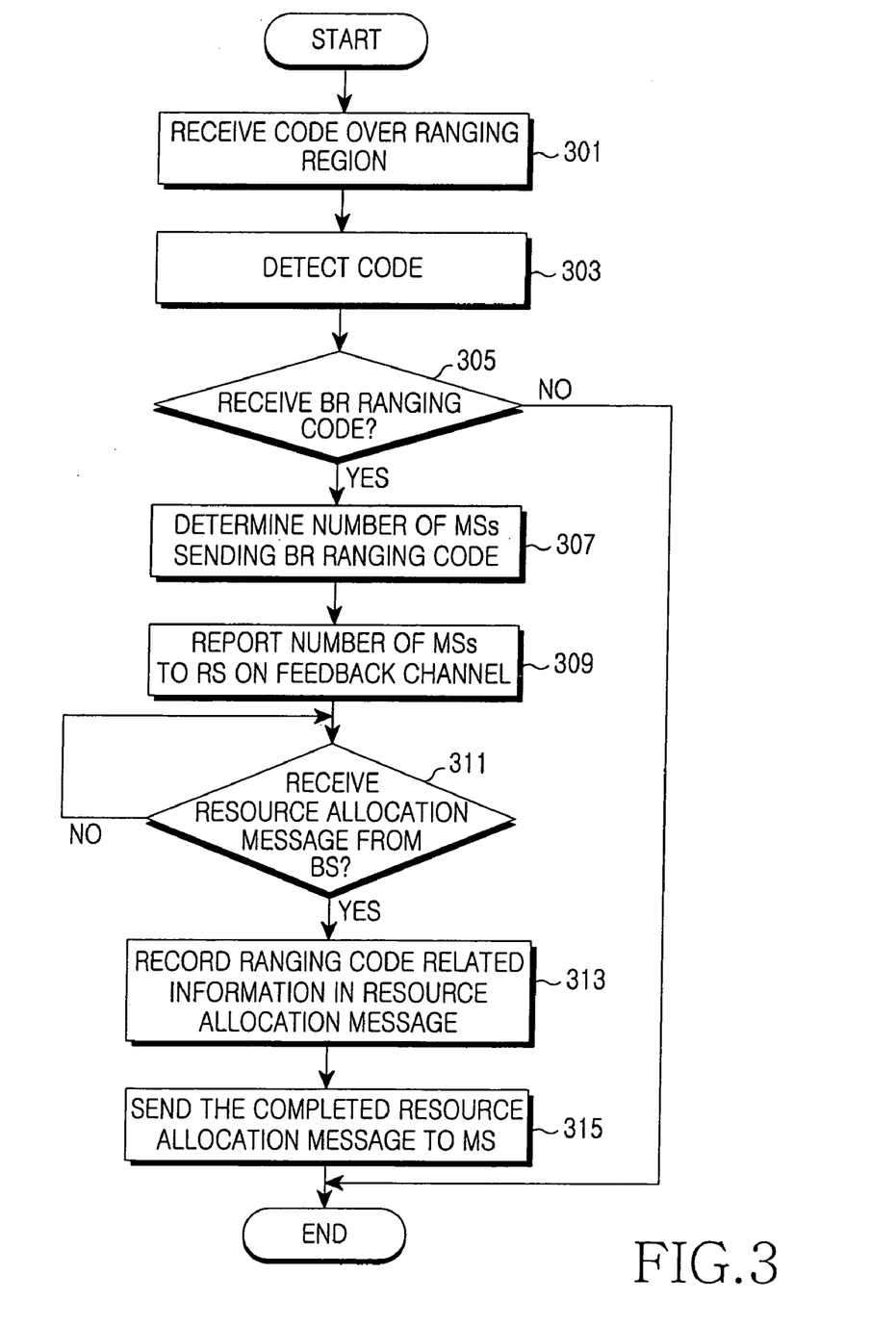
FIG. 3 illustrates operations of an RS in a multihop relay broadband wireless communication system according to an embodiment of the present invention.

FIG. 3 illustrates operations of the RS in a multihop relay broadband wireless communication system according to an embodiment of the present invention.

The RS extracts the received signal from the BR ranging region in step 301. The RS acquires frequency-domain data by OFDM-demodulating the received signal and extracts the data to which the BR ranging code is mapped from the frequency-domain data.

In step 303, the RS demodulates the code by correlating the extracted data with the ranging codes. In more detail, the RS correlates the received signal of each ranging slot with the ranging codes and acquires the codes of the detected correlation peak.

In step 305, the RS determines based on the result of the code demodulation whether the BR ranging code is received. That is, the RS examines whether there exists the code from which the correlation peak is detected. When the BR ranging code is received, the RS determines the number of mobile stations which transmit the BR ranging code in step 307. Namely, the RS checks the number of the BR ranging codes detected in the BR ranging region.

Next, the RS reports the number of the BR ranging codes to the BS using the resource (e.g., CQI channel) allocated from the BS in step 309. Using the CQI channel for the report, the RS reports the number of the ranging codes to the BS as a code. In general cases, the RS can report the number of the ranging codes to the BS as a message using the allocated resource. For example, the RS can be allocated the resource to report on the number of the ranging codes through the CQICH allocation message of Table 1. The resource allocation message to report on the number of the ranging codes may be modified from the existing message as shown in Table 1 or be an uplink resource allocation message (UL-MAP IE) of a different type.

In step 311, the RS checks whether a resource allocation message (e.g., CDMA_Allocation_IE) is received from the BS in response to the BR ranging code. The resource allocation message is a message which allocates the resource for the MS to transmit the BR message (or the BR header or data). An example of the resource allocation message is shown in Table 2. Herein, not knowing the ranging code sent from the MS, the BS records only the duration information and the BW request mandatory information, fills the remaining fields with zeros in Table 2, and then transmits the resource allocation message.

Upon receiving the resource allocation message, the RS records the ranging code related information (the repetition coding indication information, the ranging code information, the ranging symbol information, and the ranging subchannel information) of the received resource allocation message in step 313. In step 315, the RS transmits the updated resource allocation message to the corresponding MS.

Figure 4:
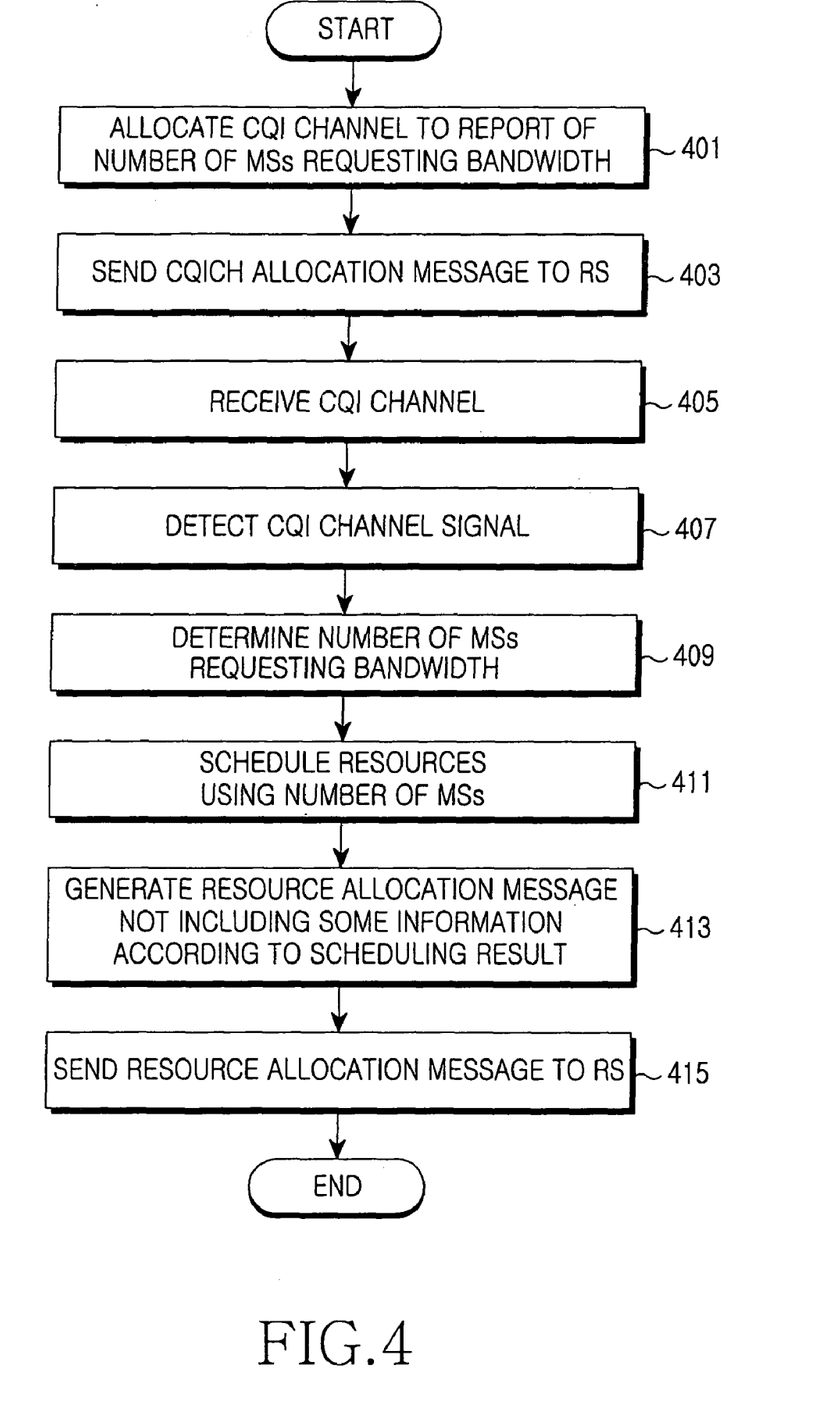
FIG. 4 illustrates operations of a BS in the multihop relay broadband wireless communication system according to an embodiment of the present invention.

FIG. 4 illustrates operations of the BS in the multihop relay broadband wireless communication system according to an embodiment of the present invention.

The BS allocates the resource (e.g., CQI channel) to the RS through the scheduling so as to report of the number of mobile stations sending the ranging code in step 401.

In step 403, the BS generates and transmits a message informing of the allocated resource to the RS. An example of the message is shown in Table 1, which can include information for identifying the allocated resource, feedback period, feedback start point (frame offset), feedback duration, and feedback type information.

Next, the BS extracts the received signal from the allocated resource in step 405. More specifically, the BS acquires the frequency-domain data by OFDM-demodulating the received signal and extracts the data mapped to the allocated resource from the frequency-domain data. In step 407, the BS recovers the information bit stream received through the allocated resource by demodulating the extracted data. In step 409, the BS determines the number of mobile stations performing the BR ranging to the RS by analyzing the information bit stream.

In step 411, the BS schedules resources using the determined number of the mobile stations. The BS allocates an uplink resource to send the BR message (or the BR header). Note that the resource may not be allocated to all of the mobile stations performing the BR ranging but is allocated to all or part of the mobile stations according to the scheduling.

In step 413, the BS generates a resource allocation message (e.g., CDMA_Allocation_IE) in response to the BR ranging code according to the result of the scheduling. An example of the resource allocation message is shown in Table 2. Not knowing the ranging code sent from the MS, the BS records only the duration information and the BW request mandatory information and fills the remaining fields (the ranging code related fields) with one or more zeros in Table 2. In step 415, the BS transmits the generated resource allocation message to the RS. The RS relays the resource allocation message to the MS after recording the ranging code related information in the remaining fields (the ranging code related fields) of the resource allocation message.

For instance, the BS generates and transmits the resource allocation message of Table 2 to the RS. The BS transmits the resource allocation message to the RS by filling the ranging code related information with a void value (e.g., fill the relevant fields with value '0'), and the RS transmits the resource allocation message to the MS after updating the fields previously filled with the void values or zeros with the appropriate ranging code and transmit region information.

As well, since the transmission of the void value can cause the waste of the resource, CDMA_Allocation_IE transmitted from the BS to the RS may be newly defined. In this case, the new CDMA_Allocation_IE can include only the duration information and the BW request mandatory information.

Alternatively, the information relating to the resources allocated in response to the BR ranging codes may be included in a single message (or Information Element (IE)) and transmitted to the RS. After reporting of the number of the mobile stations sending the BR ranging code to the BS, the RS can receive a message in response and constitute CDMA_Allocation_IEs to be sent to the corresponding mobile stations by analyzing the message.

Figure 5:
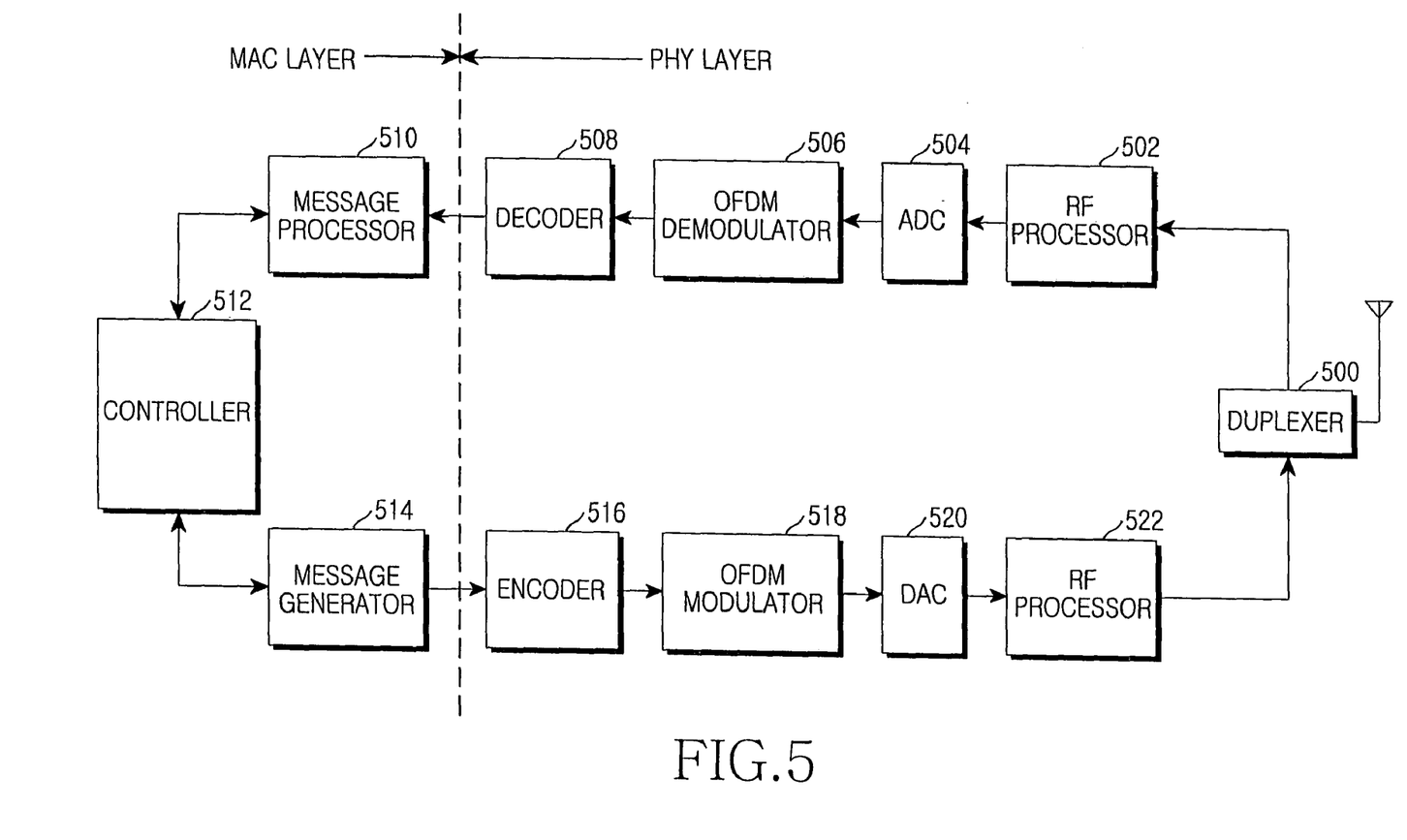
FIG. 5 illustrates a structure of the BS (or the RS) in the multihop relay broadband wireless communication system according to an embodiment of the present invention.

Now, the structures of the BS and the RS are illustrated. Since the BS and the RS having the same interface module (communication module) are constructed the same way, the operations of the BS and the RS will be explained using one apparatus.

FIG. 5 is a block diagram of the BS (or the RS) in the multihop relay broadband wireless communication system according to an embodiment of the present invention.

The BS (or the RS) includes a duplexer 500, a Radio Frequency (RF) processor 502, an Analog-to-Digital Converter (ADC) 504, an OFDM demodulator 506, a decoder 508, a message processor 510, a controller 512, a message generator 514, an encoder 516, an OFDM modulator 518, a Digital-to-Analog Converter (DAC) 520, and an RF processor 522. Hereafter, a Time Division Duplex (TDD)-OFDMA system is assumed, and the processing of a control message (or a MAC management message) is mainly described.

The duplexer 500 forwards a received signal from an antenna to the RF processor 502 and transmits a transmitted signal from the RF processor 522 over the antenna according to the duplexing scheme.

In the receive interval, the RS processor 502 converts an RF signal received on the antenna to a baseband analog signal. The ADC 504 converts the analog signal output from the RF processor 502 to sample data. The OFDM demodulator 506 output frequency-domain data by Fast Fourier Transform (FFT)-processing the sample data output from the ADC 504.

The decoder 508 selects data of subcarriers to be actually received from the frequency-domain data fed from the OFDM demodulator 506, demodulates and decodes the selected data according to a preset modulation level (Modulation and Coding Scheme (MCS) level).

The message processor 510 decomposes the control message fed from the decoder 508 and provides the result to the controller 512. In the embodiment of the present invention, the message processor 510 extracts various control information from the received control message and provides the extracted control information to the controller 512.

The controller 512 properly processes the information output from the message processor 510 and provides the processing result to the message generator 514. The message generator 514 generates a message with the information provided from the controller 512 and outputs the generated message to the encoder 516 of the physical layer.

The encoder 516 encodes and modulates the data output from the message generator 514 according to a present modulation level (MCS level). The OFDM modulator 518 outputs sample data (OFDM symbols) by Inverse Fast Fourier Transform (IFFT)-processing the data output from the encoder 516. The DAC 520 converts the sample data to an analog signal. The RF processor 522 converts the analog signal output from the DAC 520 to an RF signal and transmits the RF signal over the antenna.

The controller 512, which is a protocol controller, controls the message processor 510 and the message generator 514. That is, the controller 512 can function as the message processor 510 and the message generator 514. They are separately provided to distinguish their functions. In the actual implementation, the controller 512 can control all or part of the message processor 510 and the message generator 514. It is assumed that the controller 512 schedules the resources.

The operations of the BS and the RS constructed as shown in FIG. 5 are now explained.

As for the RS, a ranging code detector (not shown) of the decoder 508 extracts the subcarrier values to which the ranging signal is mapped from the subcarrier values output from the OFDM demodulator 506 and detects the code by multiplying the extracted subcarrier values by the ranging codes. In further detail, the ranging code detector correlates the signal received on the ranging slots with the ranging codes respectively and provides the number of the code of the detected correlation peak to the controller 512.

The controller 512 determines the number of the mobile stations sending the BR ranging code based on the number of the detected codes, and provides the determined number of the mobile stations (or the number of the BR ranging codes) to the encoder 516 of the physical layer.

A CQI channel generator (not shown) of the encoder 516 generates and outputs a feedback signal to be sent on the CQI channel based on the number of the BR ranging codes output from the controller 512. The OFDM modulator 518 maps the feedback signal to a pre-allocated CQI channel and OFDM-processes the mapped feedback signal. Next, the OFDM-modulated signal goes through the DAC 520, the RF processor 522, and the duplexer 500 and then is transmitted over the antenna. As such, when the report is made to the BS on the CQI channel, the number of the BR ranging codes is transmitted as the code. In general cases, the number of the BR ranging codes is reported to the BS as the message.

After transmitting the number of the BR ranging codes to the BS on the CQI channel, the controller 512 determines whether the resource allocation message (CDMA_Allocation_IE) is received in response to the BR ranging codes. In other words, the message processor 510 analyzes the control message received from the BS and provides the analysis result to the controller 512. When receiving the resource allocation message of Table 2, the controller 512 fetches the ranging code related information to be recorded in the resource allocation message from the memory and provides the fetched information together with the received resource allocation message to the message generator 514. More specifically, the controller 512 stores the information relating to the BR ranging code received from the MS, and provides the stored ranging code related information and the received resource allocation message to the message generator 514 when the resource allocation message of the ranging code is received from the BS.

Next, the message generator 514 updates the resource allocation message by recording the ranging code information in the received resource allocation message. The message generator 514 provides the completed resource allocation message to the encoder 516 of the physical layer. The resource allocation message is processed into a transmitted form of the physical layer and then transmitted to the MS over the antenna.

As for the BS, the controller 512 allocates the resource to the RS to report on the number of the BR ranging codes through the scheduling, and provides the allocation information to the message generator 514.

The message generator 514 generates the resource allocation message (e.g., UL MAP IE of Table 1¬)) using the allocation information fed from the controller 512 and provides the generated resource allocation message to the encoder 516 of the physical layer. The UL MAP IE is processed to a transmittable form of the physical layer and transmitted to the RS via the antenna.

After transmitting the UL MAP IE, the decoder 508 demodulates the signal received through the allocated resource and provides the information bit stream to the controller 512 after the demodulation. The controller 512 acquires the number of the BR ranging codes received from the RS by interpreting the information bit stream output from the decoder 508. The controller 512 uses the number of the BR ranging codes for the resource scheduling and controls the message generator 514 according to the result of the scheduling.

The message generator 514 generates the resource allocation message (e.g., CDMA_Allocation_IE) in response to the BR ranging code under the control of the controller 512 and provides the generated resource allocation message to the encoder 516 of the physical layer. The resource allocation message is transmitted to the MS connected to the RS and is shown in Table 2. Herein, since not knowing the ranging code sent by the MS, the BS provides the resource allocation message to the physical layer by recording only the duration information and the BW request mandatory information and filling the remaining fields with the void values (zeroes) in Table 2. The resource allocation message with the partial information recorded is processed to a transmittable form of the physical layer and then transmitted to the RS over the antenna.

Hereinafter, a specific application of the present invention is explained to facilitate understanding.

Figure 6:
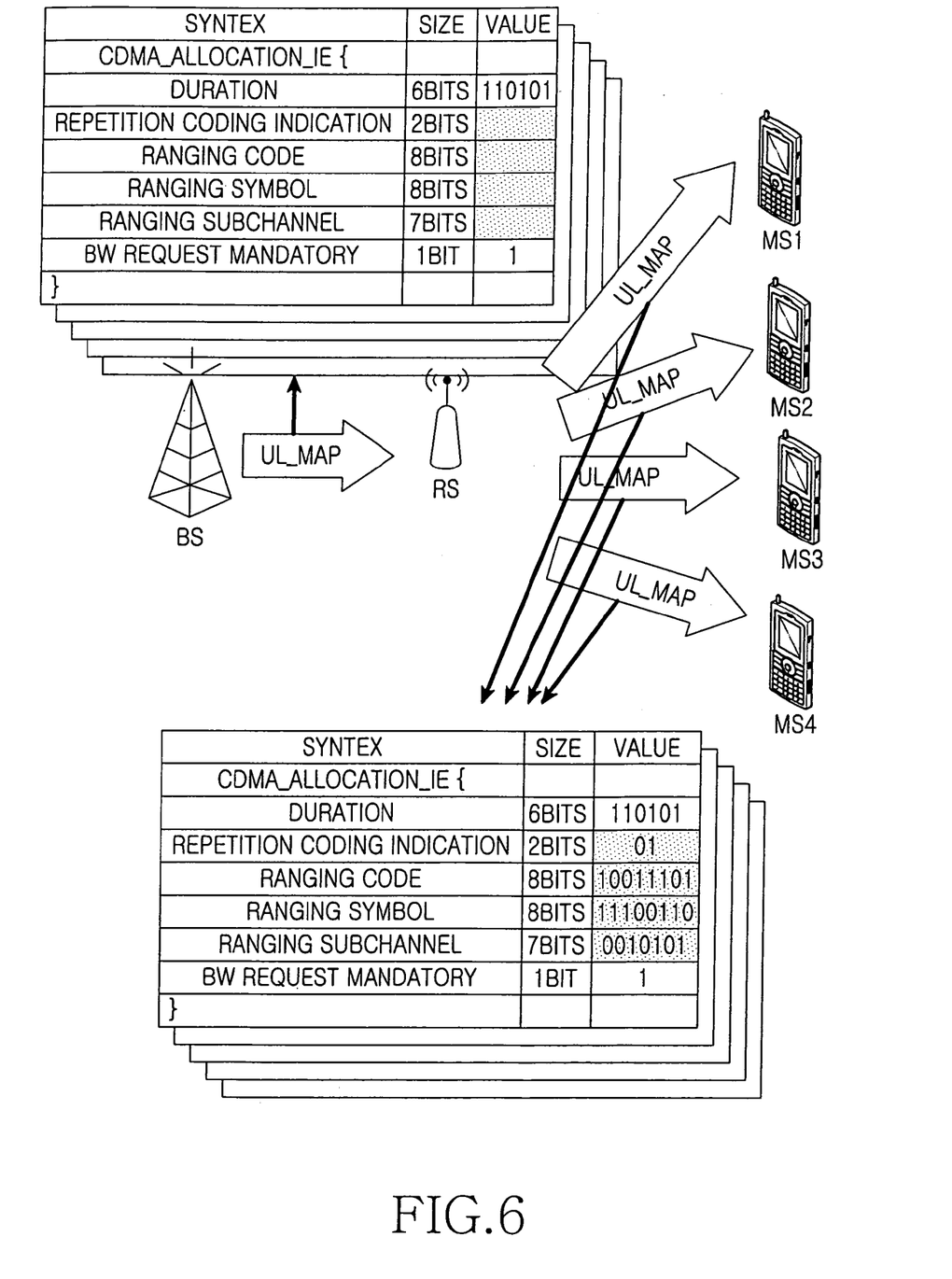
FIG. 6 illustrates an application of the present invention.

FIG. 6 illustrates an application of the present invention.

It is assumed that MS1, MS2, MS3, and MS4 are connected to an RS. The MS1 and the MS2 need to request the resource (or to request the bandwidth) to send data. To request the resource, an uplink resource is required. Thus, the mobile stations send the ranging code (the CDMA code) for the bandwidth request over the ranging region. If the ranging codes from the mobile stations do not collide with one another, the RS can successfully receive all of the four ranging codes. The RS checks whether the ranging codes received from the mobile stations request the bandwidth. If so, the RS transmits the number of the mobile stations sending the code to the BS using the pre-allocated resource (e.g., CQI channel). Here, as the four mobile stations send the code, the RS can transmit the value '4 (0b000100)' to the BS.

Meanwhile, upon receiving the report on the number of the mobile stations sending the code, the BS allocates the uplink resources through the scheduling and transmits the resource allocation messages (CDMA_Allocation_IE) generated based on the allocation result to the RS. In doing so, since not knowing the ranging code information transmitted from the mobile stations, the BS transmits the resource allocation messages with the ranging code related fields vacant. The RS relays the resource allocation messages from the BS to the mobile stations after filling in the zeroed out fields with the ranging code related information.

As set forth above, it is possible to efficiently process the BR ranging code received from the MS connected to the RS without the waste of the resource. Since the number of the mobile stations sending the BR ranging code is reported to the BS, the signaling overhead can be reduced and the resource can be utilized far more efficiently.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A communication method of a Relay Station (RS) in a multihop relay wireless communication system, the method comprising:
   receiving one or more bandwidth request ranging codes from subordinate subscriber stations of the relay station;
   determining a number of the received bandwidth request ranging codes;
   forwarding a header message indicating the number of the bandwidth request ranging codes to a base station;
   receiving one or more resource allocation messages from the base station in response to the number of the bandwidth request ranging codes,
   wherein dummy values are recorded in ranging code related fields in the resource allocation message.

2. The communication method of claim 1, further comprising:
   updating the resource allocation messages by filling ranging code related information in the resource allocation messages; and
   transmitting the updated resource allocation messages to the subordinate subscriber stations.

3. The communication method of claim 2, wherein the ranging code related information comprises at least one of ranging code information, ranging symbol information, and ranging subchannel information.

4. The communication method of claim 2, wherein the resource allocation message is a Code Division Multiple Access (CDMA)_Allocation_Information Element (IE).

5. The communication method of claim 1, wherein the number of the bandwidth request ranging codes is reported to the base station on a channel quality indicator channel or as a message.

6. A communication method of a base station in a multihop relay wireless communication system, the method comprising:
   allocating a resource to a relay station to report on a number of detected bandwidth request ranging codes;
   receiving a header message indicating the number of the bandwidth request ranging codes using the allocated resource;
   scheduling resources according to the reported number of the bandwidth request ranging codes;
   generating a resource allocation message to allocate a resource to a subscriber station which sends the bandwidth request ranging code, according to the scheduled resources, and transmitting the generated resource allocation message to the relay station, wherein dummy vales are recorded in ranging code related fields in the resource allocation message.

7. The communication method of claim 6, wherein the ranging code related fields comprise at least one of a ranging code field, a ranging symbol field, and a ranging subchannel field.

8. The communication method of claim 6, wherein the allocated resource is a Channel Quality Indicator (CQI) channel or a resource for carrying a message.

9. A relay station in a multihop relay wireless communication system comprising:
   a controller configured to determine a number of bandwidth request ranging codes received from subordinate subscriber stations of the relay station;
   a transmitter configured to transmit a header message indicating the number of bandwidth request ranging codes to a base station; and
   a receiver configured to receive one or more resource allocation messages from the base station in response to the number of the bandwidth request ranging codes,
   wherein dummy values are recorded in ranging code related fields in the resource allocation message.

10. The relay station of claim 9, further comprising:
    a message generator for updating the resource allocation messages by filling ranging code related information in the received resource allocation messages,
    wherein the updated resource allocation messages are transmitted to the subscriber stations.

11. The relay station of claim 10, wherein the ranging code related information comprises at least one of ranging code information, ranging symbol information, and ranging subchannel information.

12. The relay station of claim 10, wherein the resource allocation message is a Code Division Multiple Access (CDMA)_Allocation_Information Element (IE).

13. The relay station of claim 9, wherein the number of the bandwidth request ranging codes is reported to the BS on a Channel Quality Indicator (CQI) channel or as a message.

14. A base station in a multihop relay wireless communication system comprising:

a transmitter configured to transmit a message to allocate a resource to a Relay Station (RS) to report a number of bandwidth request ranging codes;

a receiver configured to receive a header message indicating the number of the bandwidth request ranging codes using the allocated resource;

a controller configured to schedule resources according to the number of the bandwidth request ranging codes; and a message generator configured to generate a resource allocation message to allocate a resource to a subscriber station which sends one of the bandwidth request ranging codes according to the result of the scheduling, wherein the generated resource allocation message is transmitted to the relay station, and wherein dummy values are recorded in ranging code related fields in the resource allocation message.

15. The base station of claim 14, wherein the ranging code related fields comprise at least one of a ranging code field, a ranging symbol field, and a ranging subchannel field.

16. The base station of claim 14, wherein the allocated resource is a Channel Quality Indicator (CQI) channel or a resource for carrying a message.

17. A method for processing a bandwidth request in a multihop relay wireless communication system, the method comprising:

receiving, at a relay station, one or more bandwidth request ranging codes from subordinate subscriber stations;

reporting, at the relay station, a number of the received bandwidth request ranging codes to a base station;

generating, at the base station, one or more resource allocation messages according to the number of the bandwidth request ranging codes, and ranging code related fields of the resource allocation message that includes dummy values;

transmitting, at the base station, the one or more resource allocation messages to the relay station;

updating, at the relay station, the resource allocation messages by including ranging code related information in the resource allocation messages; and broadcasting, at the relay station, the updated one or more resource allocation messages to the subordinate subscriber stations.

18. The method of claim 17, wherein the ranging code related information comprises at least one of ranging code information, ranging symbol information, and ranging subchannel information.

19. The method of claim 17, wherein the resource allocation message is a Code Division Multiple Access (CDMA)_Allocation_Information Element (IE).

20. The method of claim 17, wherein the number of the bandwidth request ranging codes is reported to the BS on a Channel Quality Indicator (CQI) channel or as a message.

* * * * *